United States Patent
Numano et al.

(10) Patent No.: US 8,450,634 B2
(45) Date of Patent: May 28, 2013

(54) RESISTANCE WELDING APPARATUS AND RESISTANCE WELDING METHOD

(75) Inventors: Masamitsu Numano, Tochigi (JP); Yuya Ishikawa, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 1143 days.

(21) Appl. No.: 12/236,080

(22) Filed: Sep. 23, 2008

(65) Prior Publication Data

US 2010/0072176 A1    Mar. 25, 2010

(51) Int. Cl.
*B23K 11/00* (2006.01)

(52) U.S. Cl.
USPC ........................ 219/117.1; 219/108

(58) Field of Classification Search
USPC .............. 219/91.1, 86.1, 108, 109, 110, 86.4, 219/86, 117, 117.1; 364/477.06; 324/703, 324/718, 713; 700/212
See application file for complete search history.

(56) References Cited

U.S. PATENT DOCUMENTS

| | | | | |
|---|---|---|---|---|
| 4,005,307 A | * | 1/1977 | Tamura et al. | 219/109 |
| 5,406,045 A | * | 4/1995 | Kiriishi et al. | 219/110 |
| 5,892,197 A | * | 4/1999 | Goto et al. | 219/110 |
| 6,043,449 A | * | 3/2000 | Kanjo | 219/109 |
| 6,118,095 A | * | 9/2000 | Nagano | 219/110 |
| 6,140,825 A | * | 10/2000 | Fujii et al. | 324/718 |

FOREIGN PATENT DOCUMENTS

| | | |
|---|---|---|
| JP | 61-014089 | 1/1986 |
| JP | 04-300078 | * 10/1992 |
| JP | 4300078 | 10/1992 |
| JP | 10202371 | 8/1998 |

* cited by examiner

*Primary Examiner* — Henry Yuen
*Assistant Examiner* — Thien S Tran
(74) *Attorney, Agent, or Firm* — Rankin, Hill & Clark LLP

(57) ABSTRACT

A resistance welding apparatus is provided with: a pair of electrode chips; a power supply device for supplying the electrode chips a welding current; and a spattering detecting device that detects a spattering. The power supply device supplies to the electrode chips a preset welding current until the spattering is detected. The power supply device supplies a current on which an additional current is added to the preset welding current, after the spattering is detected, until a preset energizing time expires.

1 Claim, 8 Drawing Sheets

RESISTANCE WELDING APPARATUS AND RESISTANCE WELDING METHOD

BACKGROUND OF THE INVENTION

1. Field of the Invention

The present invention relates to a resistance welding apparatus and method for stabilizing the welding quality in resistance welding such as spot welding.

2. Background Art

It is known that a preset welding current Iw is kept flowing for a preset energizing time T despite spattering during passage of a welding current as shown in FIG. 8(a). In addition, there is known a spot welding method in which the welding current at a beginning of the welding is set to a current value in an expulsion (spattering) occurring region and the current value is reduced to 0.5 to 0.9 times the original value at the time point the expulsion has occurred and the resulting current is supplied at least for three cycles (for example, refer to JP-A-61-014089).

In case spatters are generated, a nugget size is reduced and a nugget growth speed drops by generation of the spatters as shown in FIG. 8(b) even when the preset welding current Iw is kept flowing for a preset energizing time T. Thus, the required nugget size may not be reached and the strength may be insufficient.

The spot welding method disclosed in JP-A-61-014089 has a problem of extended cycle time.

SUMMARY OF THE INVENTION

One or more embodiments of the invention provide a resistance welding apparatus and method capable of acquiring desired strength and cycle time even in the presence of spattering.

In accordance with one or more embodiments of the invention, a resistance welding apparatus is provided with: a pair of electrode chips (3, 4); a power supply device (100) for supplying the electrode chips (3, 4) a welding current; and a spattering detecting device (101) that detects a spattering. In the resistance welding apparatus, the power supply device (100) supplies the pair of electrode chips (3, 4) a preset welding current (Iw) until the spattering is detected. The power supply device (100) supplies a current (Iw+Iα, Iw+Iβ) on which an additional current (Iα, Iβ) is added to the preset welding current (Iw), after the spattering is detected, until a preset energizing time (T) expires.

The resistance welding apparatus may further include a voltage detector (5) for detecting a voltage between the electrode chips (3, 4). The spattering detecting device (101) may detect the spattering based on a change of the voltage between the electrode chips (3, 4).

The resistance welding apparatus may further include an electrode displacement detecting device (102) for detecting an electrode displacement amount of the electrode chips (3, 4). The spattering detecting device (101) may detect the spattering based on a change of the electrode displacement amount.

The resistance welding apparatus may further include a resistance detecting device (103) for detecting a resistance value between the electrode chips (3, 4). The spattering detecting device (101) may detect the spattering based on a change of the resistance value.

Moreover, in the aforementioned resistance welding apparatus, the additional current (Iα) may be a predetermined amount of current (Iα).

Furthermore, the aforementioned resistance welding apparatus may further include a monitoring device (104) for monitoring an amount of heat input per unit time (Q), after the spattering is detected. The power supply device (100) may increase the additional current (Iβ) until the amount of heat input per unit time (Q) caused by the additional current (Iβ) has reached an amount of heat input per unit time (A) just before the spattering.

Further, in accordance with one or more embodiments of the invention, a resistance welding method includes the steps of: detecting a spattering; supplying a preset welding current until the spattering is detected; and supplying a current on which an additional current is added to the preset welding current, after the spattering is detected, until a preset energizing time expires.

In the resistance welding method, the spattering may be detected based on a change in an amount of electrode displacement, a change in a voltage between electrode or a resistance between the electrodes, in the detecting step.

In the resistance welding method, the additional current may be a predetermined amount of current.

The resistance welding method according may further include the steps of: monitoring an amount of heat input per unit time, after the spattering is detected; and increasing the additional current until the amount of heat input per unit time caused by the additional current has reached an amount of heat input per unit time just before the spattering.

According to the resistance welding apparatus and method of the embodiments, it is possible to suppress reduction of nugget growth speed after spattering and reliably obtain the necessary strength. It is also possible to suppress the extension of energizing time.

According to the resistance welding apparatus and method of the embodiments, it is possible to correctly detect spattering during passage of a welding current.

Other aspects and advantages of the invention will be apparent from the following description, the drawings and the claims.

BRIEF DESCRIPTION OF THE DRAWINGS

FIG. 2(a) shows the relationship between the energizing time and welding current. FIG. 2(b) shows the relationship between the energizing time and the amount of heat input per unit time. FIG. 2(c) shows the relationship between the energizing time and the size of the nugget.

FIG. 4(a) shows the relationship between the energizing time and welding current. FIG. 4(b) shows the relationship between the energizing time and the amount of heat input per unit time.

FIG. 8(a) shows the relationship between the energizing time and welding current. FIG. 8(b) shows the relationship between the energizing time and the size of the nugget.

DETAILED DESCRIPTION OF THE EXEMPLARY EMBODIMENTS

Exemplary embodiments of the invention will be described based on the attached drawings.

Figure 1:
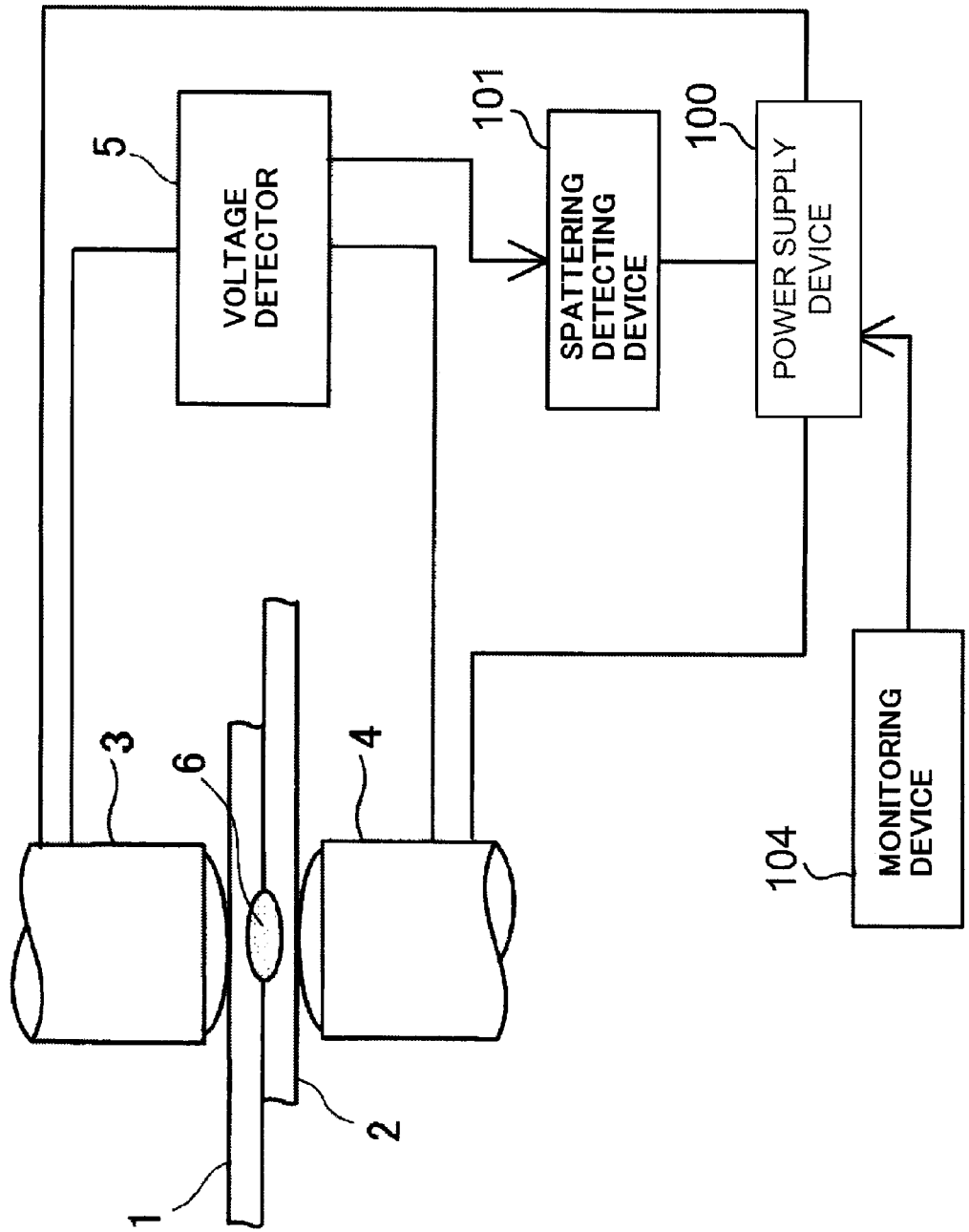
FIG. 1 is a general explanatory drawing of a spot welding device for executing a resistance welding according to the invention.
Figure 2A:
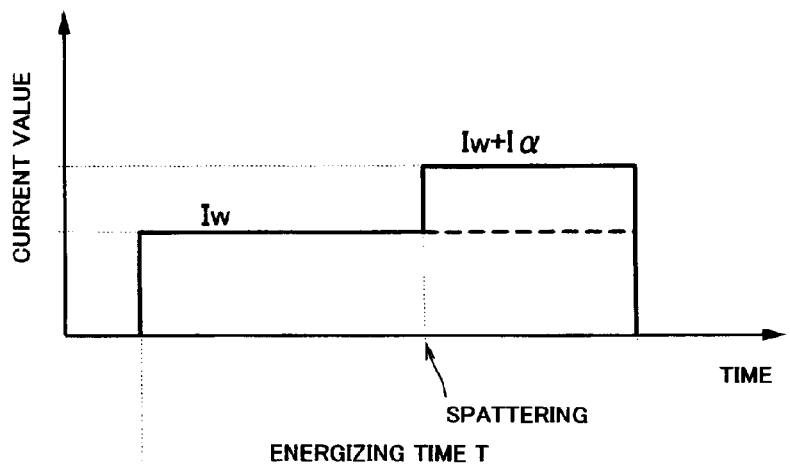
FIGS. 2(a) to 2(c) are explanatory drawings of a resistance welding according to a first embodiment of the invention.
Figure 2B:
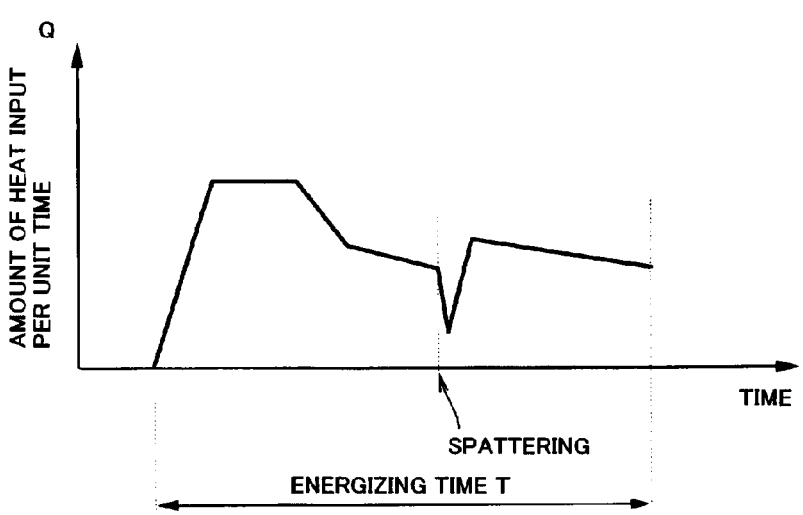
Figure 2C:
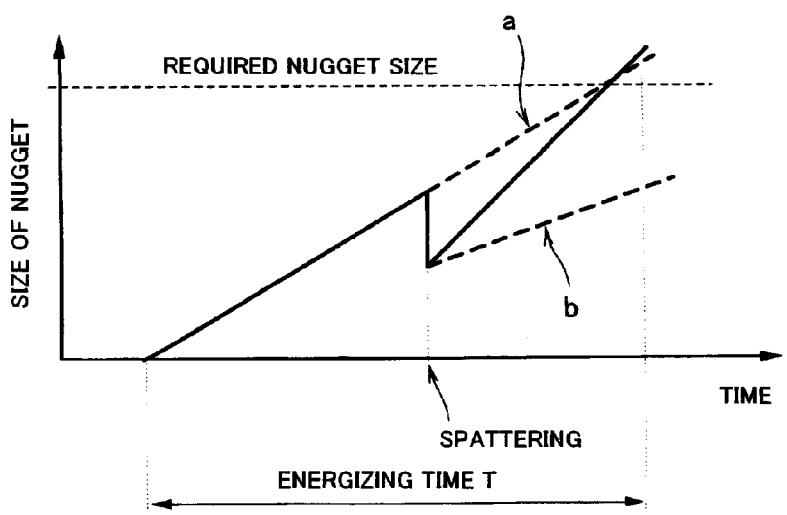
Figure 3:
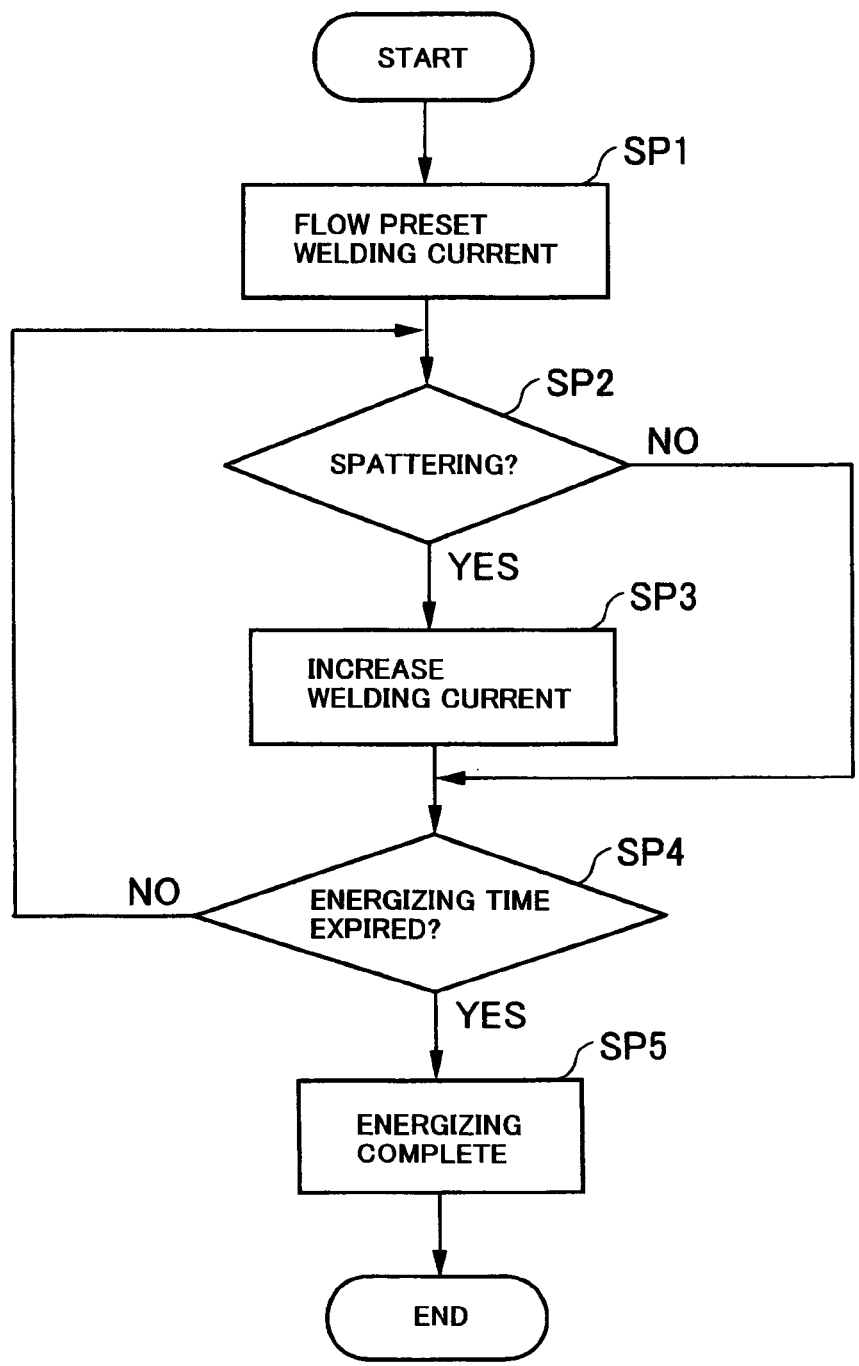
FIG. 3 is a flowchart of the resistance welding according to the first embodiment of the invention.
Figure 4A:
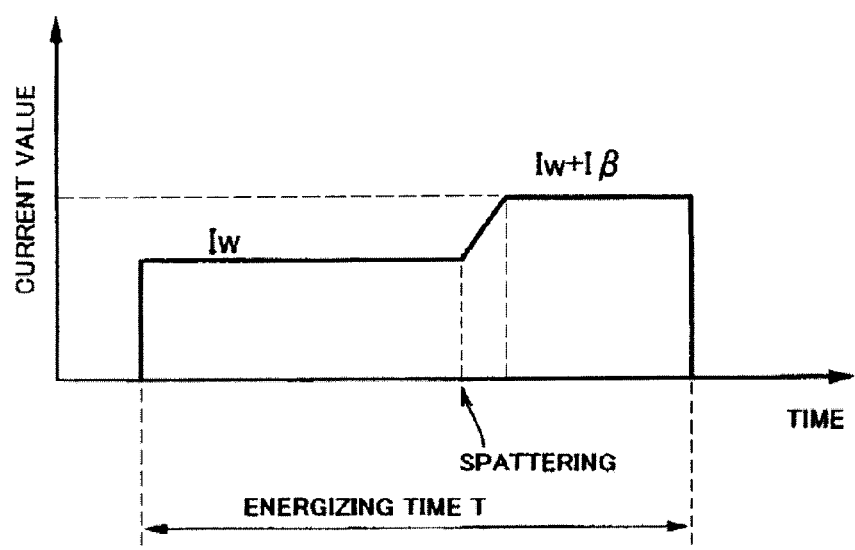
FIGS. 4(a) and 4(b) are explanatory drawings of a resistance welding according to a second embodiment of the invention.
Figure 4B:
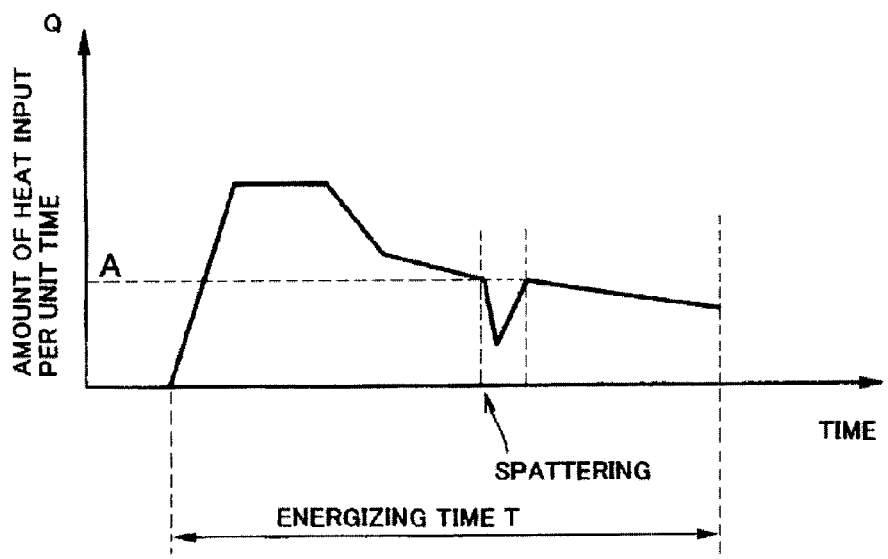
Figure 5:
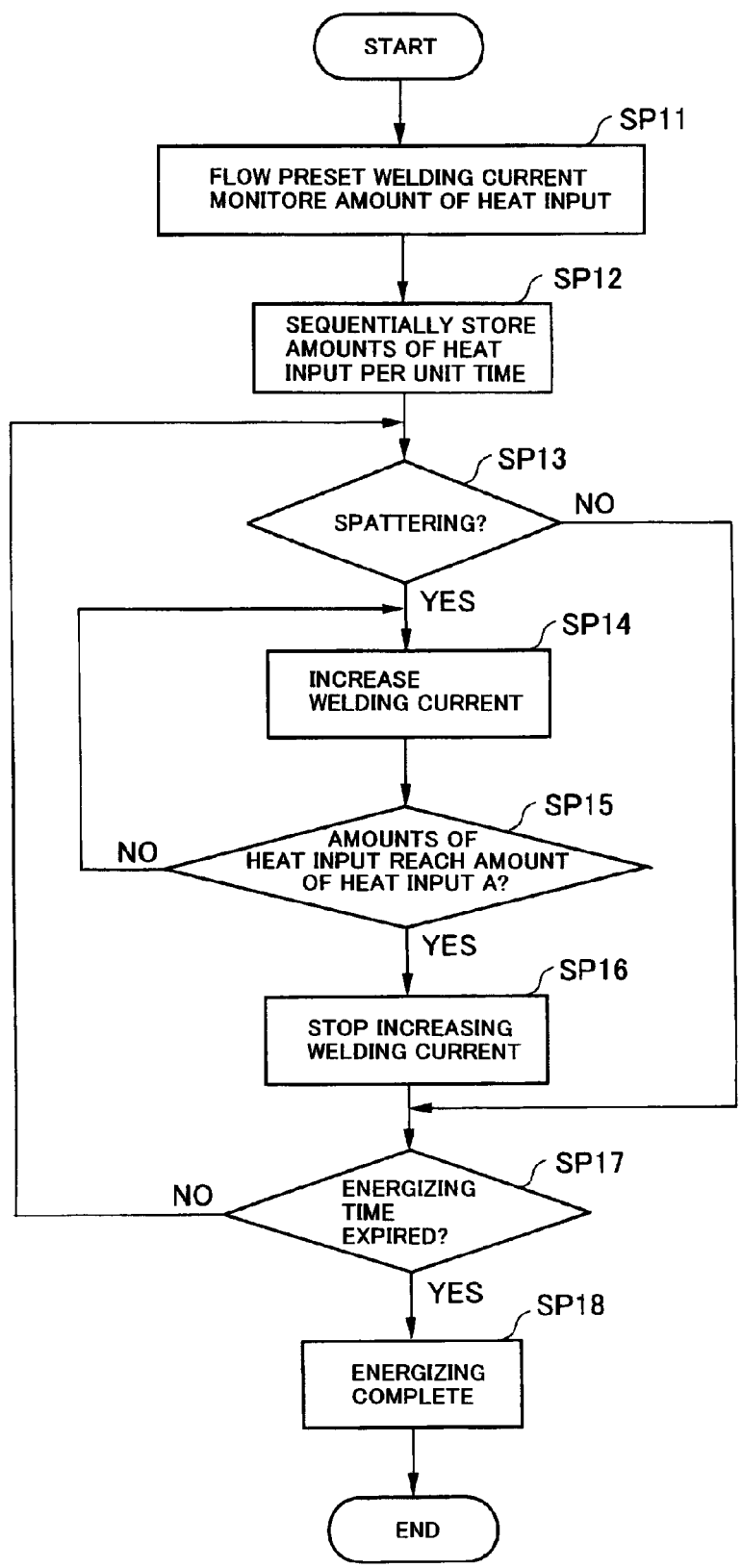
FIG. 5 is a flowchart of the resistance welding according to the second embodiment of the invention.
Figure 6:
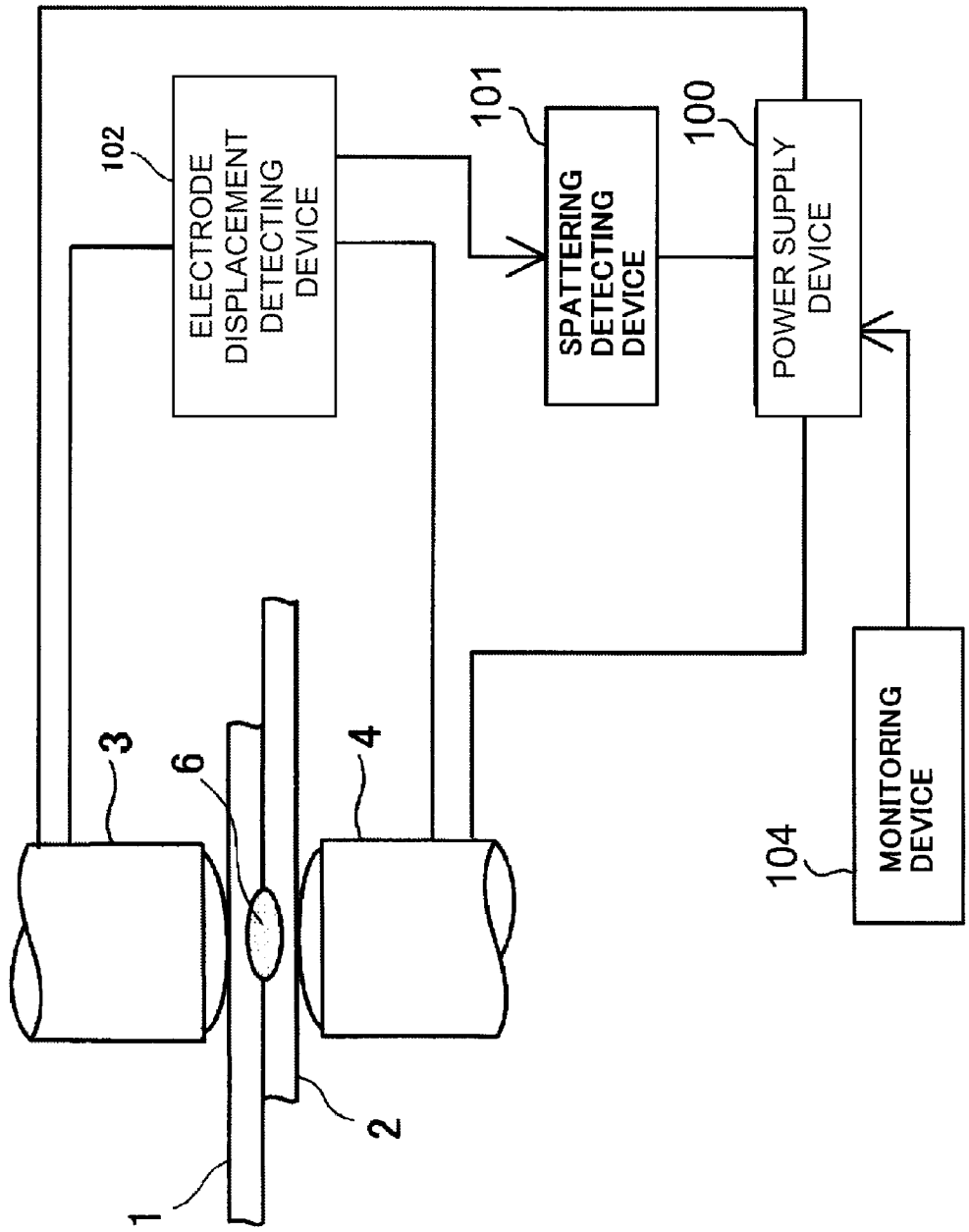
FIG. 6 is a general explanatory drawing of a spot welding device for executing a resistance welding according to a first modification.
Figure 7:
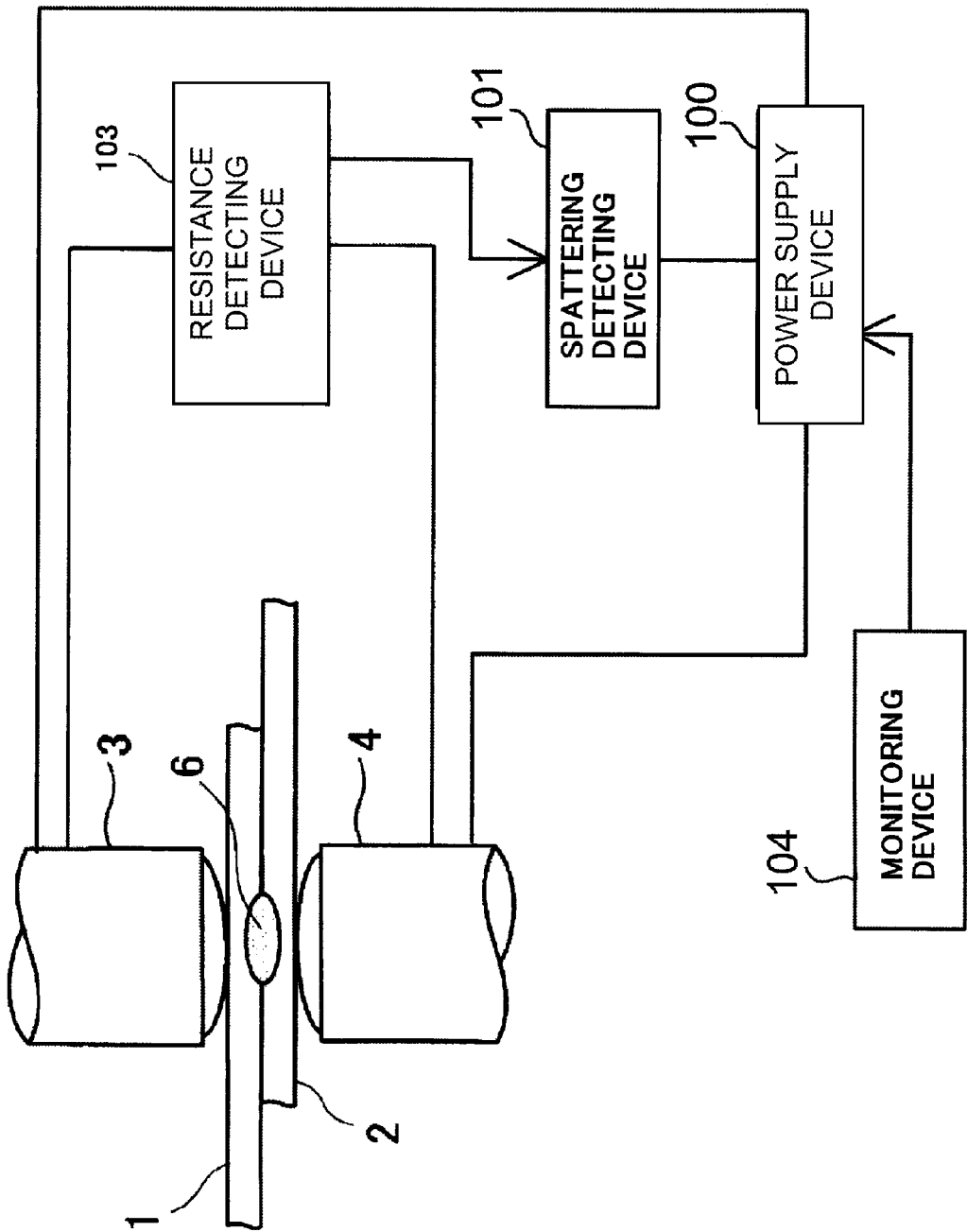
FIG. 7 is a general explanatory drawing of a spot welding device for executing a resistance welding according to a second modification.
Figure 8A:
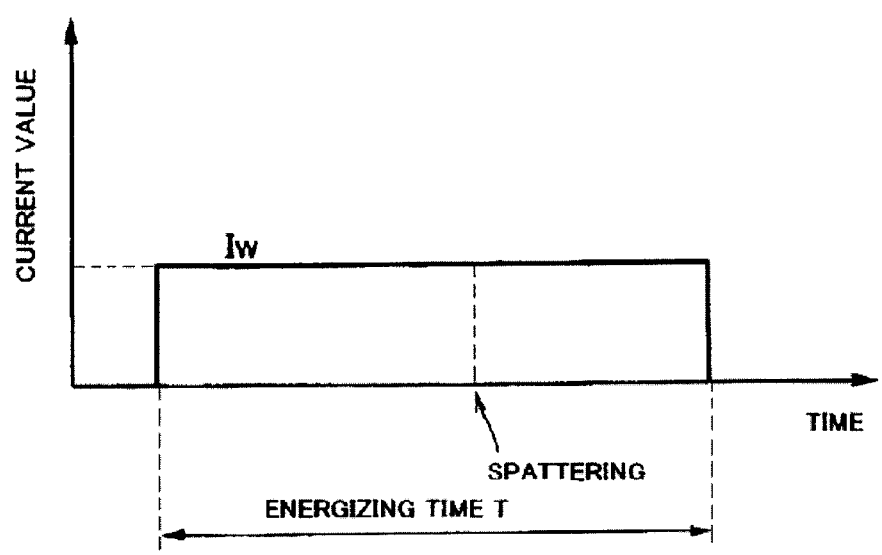
FIGS. 8(a) and 8(b) are explanatory drawings of a resistance welding method according to the related art.
Figure 8B:
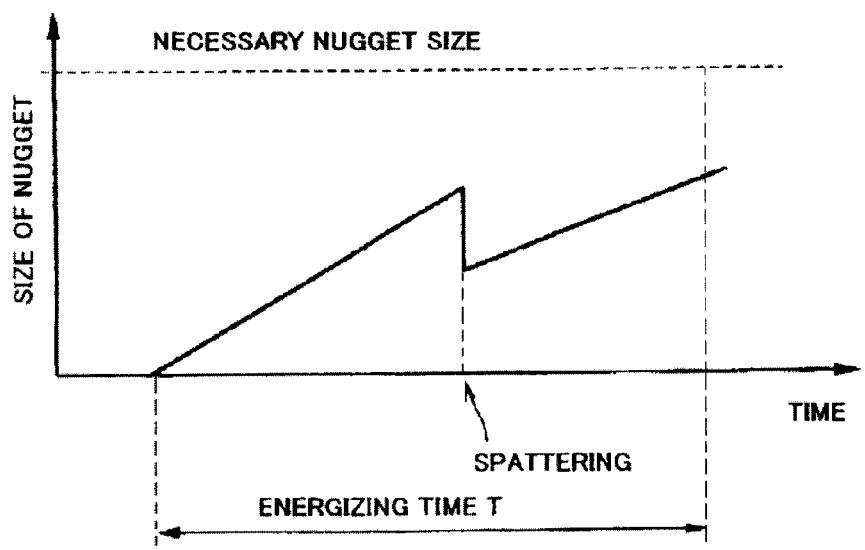

FIG. 1 is a general explanatory drawing of a spot welding device for executing a resistance welding according to the invention. FIGS. 2(a) to 2(c) are explanatory drawings of a resistance welding according to the first embodiment of the invention. FIG. 3 is a flowchart of the resistance welding according to the first embodiment of the invention. FIGS. 4(a) and 4(b) are explanatory drawings of a resistance welding according to the second embodiment of the invention. FIG. 5 is a flowchart of the resistance welding according to the second embodiment of the invention. FIG. 6 is a general explanatory drawing of a spot welding device for executing a resistance welding according to a first modification. FIG. 7 is a general explanatory drawing of a spot welding device for executing a resistance welding according to a second modification.

As shown in FIG. 1, a spot welding device for executing a resistance welding according to the invention is provided with a pair of electrode chips 3, 4 for pressurizing members 1, 2 to be welded overlaid one on the other to cause a welding current to flow, a pressure device (not shown) for applying a desired welding pressure to the electrode chips 3, 4, a power supply device 100 for supplying via the electrode chips 3, 4 a desired welding current to the members 1, 2 to be welded pressurized by the pressure device, a voltage detector 5 for detecting a change in the voltage across the electrode chips 3, 4 applied by the power supply device, and a spattering detecting device 101 for detecting a spattering.

Steps of the resistance welding according to the first embodiment executed by the spot welding device thus configured will be described in accordance with the flowchart of FIG. 3. First, in step SP1, as shown in FIG. 2(a), a welding current Iw preset as one of welding conditions is caused to flow, via the electrode chips 3, 4, to the pressurized members 1, 2 to be welded. An amount of heat input per unit time is given as shown in FIG. 2(b), and a nugget 6 grows as shown in FIG. 2(c).

Next, in step SP2, the spattering detecting device 101 determines whether the spattering has occurred during passage of a welding current. This determination is made by detecting a drop in the voltage across the electrode chips 3, 4 by way of the voltage detector 5. In case it is determined that spattering has occurred, execution proceeds to step SP3. In step SP3, as shown in FIG. 2(a), a current (Iw+Iα) obtained by adding a predetermined amount of current Iα to the welding current Iw preset by the power supply device is set as a welding current and the current (Iw+Iα) is caused to flow to the members 1, 2 to be welded. As shown in FIG. 2(b), the amount of heat input per unit time is given and as shown in FIG. 2(c), the nugget 6 continues to grow at a higher speed than in the related art after occurrence of spattering. In case it is determined that spattering has not occurred, execution proceeds to step SP4. The short broken lines shown in FIG. 2 represent a case where spattering has not occurred in the related art (FIG. 2(a)) and a case where spattering has occurred in the related art (FIG. 2(b)). The current Iα may be previously determined through testing or the like.

The nugget 6 shrinks due to spattering. To counter this problem, the welding current (Iw) is increased to (Iw+Iα) upon spattering. To obtain the size of the nugget 6 equivalent to that obtained in the absence of spattering, it is necessary to input at least an amount of heat including additional heat equal to the heat amount that has escaped from a welding part upon spattering. An increased welding current suppresses a drop in the growth speed of the nugget 6 attributable to spattering.

Next, in step SP4, it is determined whether a preset energizing time T has expired. In case it is determined that a preset energizing time T has expired, the welding current (Iw or IW+Iα) ceases to flow in step SP5 and energizing work is complete to form a single nugget 6 on the members 1, 2 to be welded. Then, even in the presence of spattering, an amount of heat input per unit time is given as shown in FIG. 2(b) and the nugget 6 has grown to a required size as shown in FIG. 2(c). In case it is determined that the preset energizing time T has not expired, execution returns to step SP2 and determination on whether spattering has occurred (step SP2) or whether the energizing time has expired (step SP4) is made again until the energizing time T expires.

Next, steps of resistance welding according to a second embodiment of the invention will be described in accordance with the flowchart of FIG. 5. In step SP11, as shown in FIG. 4(a), a welding current Iw preset as one of welding conditions is caused to flow, via the electrode chips 3, 4, to the pressurized members 1, 2 to be welded, while the amount of heat input per unit time shown in FIG. 4(b) is being monitored by a monitoring device 104. The nugget 6 grows at a predetermined speed. The amount of heat input per unit time is obtained by multiplying a voltage value by a current value, so that what is actually being monitored is a voltage value across the electrode chips 3, 4 or a resistance value across the electrode chips 3, 4. Further, the amounts of heat input per unit time are sequentially stored in step SP12.

In step SP13, it is determined whether spattering has occurred while the welding current is flowing. This determination is made by detecting a drop in the voltage across the electrode chips 3, 4 by way of the voltage detector 5. In case it is determined that spattering has occurred, execution proceeds to step SP14. In step SP14, the current value is increased as shown in FIG. 4(a) while the amount of heat input per unit time shown in FIG. 4(b) is being monitored. In case it is determined that spattering has not occurred, execution proceeds to step SP17.

Next, in step SP15, as shown in FIG. 4(b), it is determined whether the amount of heat input per unit time caused by a rise in the current value has reached the stored amount of heat input A per unit time just before spattering. In case it is determined that the amount of heat input per unit time caused by a rise in the current value has reached the stored amount of heat input A per unit time just before spattering, execution proceeds to step SP16, where a rise in the current value is stopped and a constant welding current (Iw+Iβ) is caused to flow thereafter as shown in FIG. 4. In case it is determined that the amount of heat input per unit time caused by a rise in the current value has not reached the stored amount of heat input A per unit time just before spattering, execution returns to step SP14.

Next, in step SP17, it is determined whether a preset energizing time T has expired. In case it is determined that a preset energizing time T has expired, the welding current (Iw or Iw+Iβ) ceases to flow in step SP18 and energizing work is complete to form a single nugget 6 on the members 1, 2 to be welded. In case it is determined that a preset energizing time T has not expired, execution returns to step SP13 and determination on whether spattering has occurred (step SP13) or whether the energizing time has expired (step SP17) is made again until the energizing time T expires.

In the second embodiment, it is possible to reliably provide an increased amount of heat input compared with a case where spattering does not occur. The provided amount of heat input is adequate so that the second or later spattering can be suppressed.

While the voltage detector 5 for detecting a change in the voltage across electrode chips 3, 4 is used as means for detecting spattering in the first and second embodiments, an electrode displacement detecting device 102 for detecting the electrode displacement amount changing with spattering (see FIG. 6) or a resistance detecting device 103 for detecting the resistance value across electrodes changing with spattering (see FIG. 7) may be used instead.

According to the invention, even if a spattering is occurred, a strength and cycle time equivalent to those obtained in an absence of the spattering can be obtained.

While description has been made in connection with specific embodiments and modifications of the present invention, it will be obvious to those skilled in the art that various changes and modification may be made therein without departing from the present invention. It is aimed, therefore, to cover in the appended claims all such changes and modifications falling within the true spirit and scope of the present invention.

DESCRIPTION OF THE REFERENCE NUMERALS AND SIGNS

1, 2: Member to be welded
3, 4: Electrode chip
5: Voltage detector
6: Nugget
100: Power supply device
101: Spattering detecting device
102: Electrode displacement detecting device
103: Resistance detecting device
104: Monitoring device
Iw: Preset welding current
I$\alpha$: Additional current (Predetermined amount of current)
I$\beta$: Additional current
T: Energizing time
Q: Amount of heat input per unit time

What is claimed is:
1. A resistance welding method comprising the steps of:
   providing a resistance welding apparatus comprising:
      a pair of electrode chips;
      a power supply device for supplying the electrode chips a welding current;
      a heat per unit time detecting device; and,
      a spattering detecting device that detects a spattering;
   applying a preset welding current to the electrode chips;
   monitoring an amount of heat per unit time with the heat per unit time detecting device;
   detecting spattering with said spattering detection device; and,
   after detection of spattering:
      applying an additional current to the preset welding current;
      continuing to monitor the amount of heat input per unit time; and
      increasing the additional current until the amount of heat input per unit time is equal to an amount of heat input per unit time just before spattering occurred.

* * * * *